Feb. 2, 1960 E. A. LONGENECKER 2,923,785
ENGINE DISTRIBUTOR AND METHOD OF ADJUSTMENT THEREOF
Filed Jan. 21, 1954 7 Sheets-Sheet 1
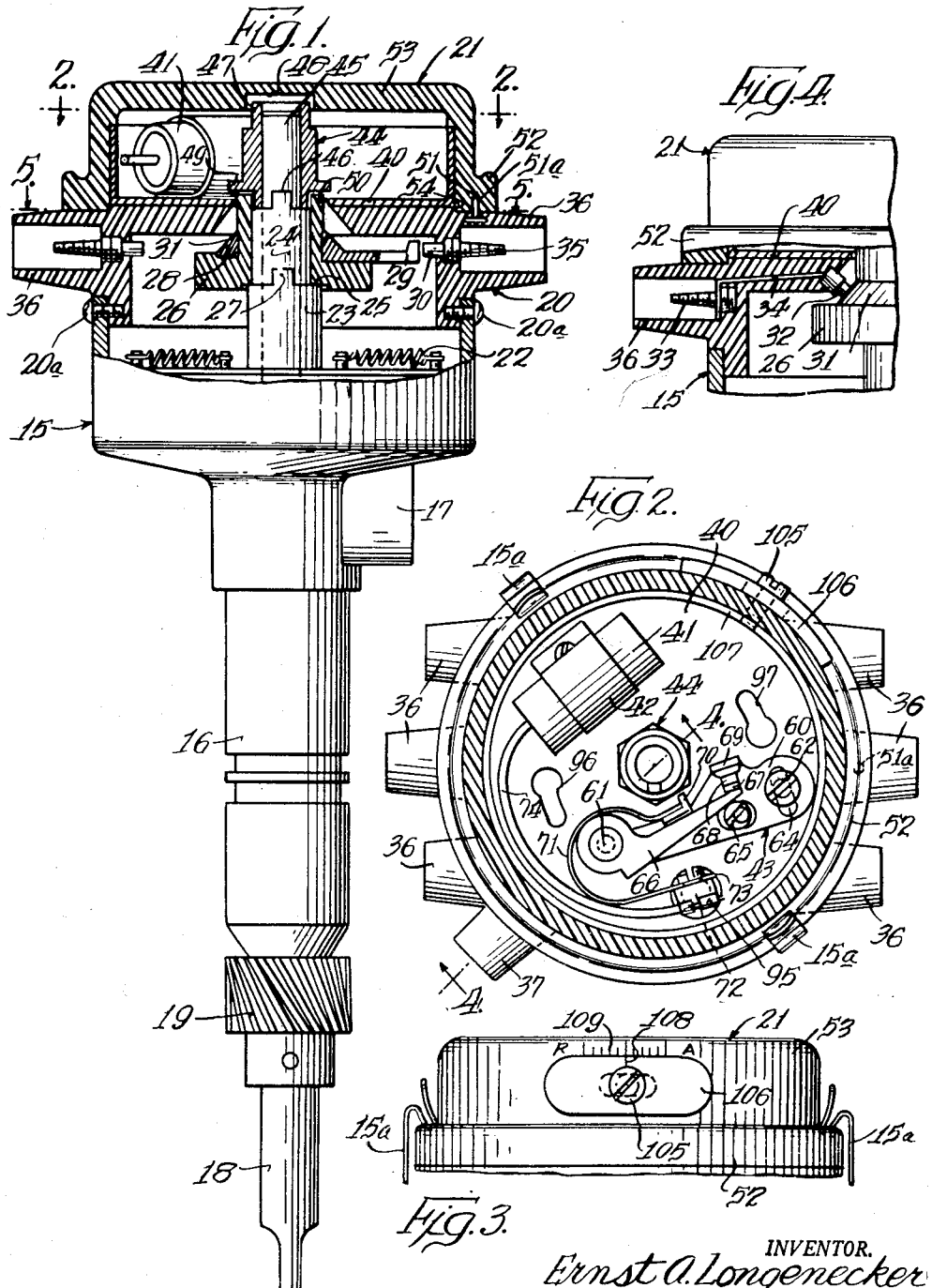
INVENTOR.
Ernst A. Longenecker
BY
Mason, Kolehmainen, Rathburn & Wyss
Attys.

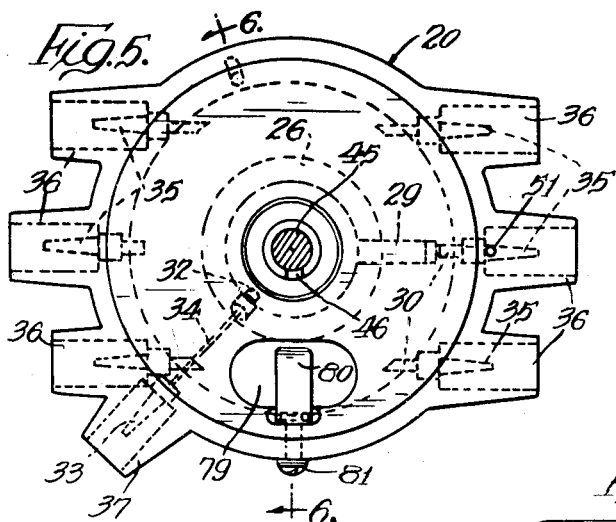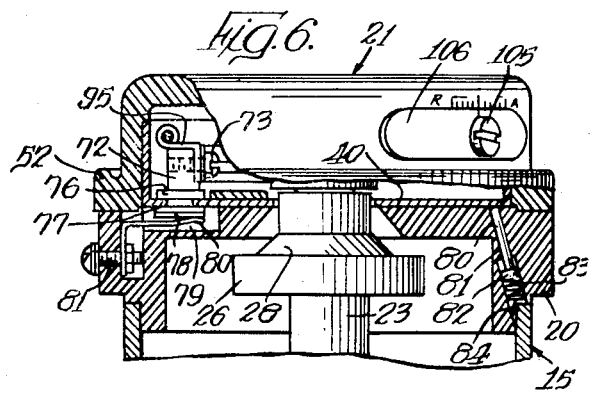

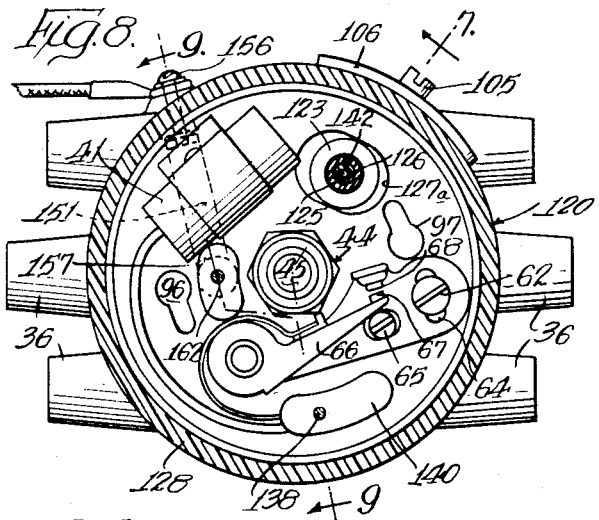

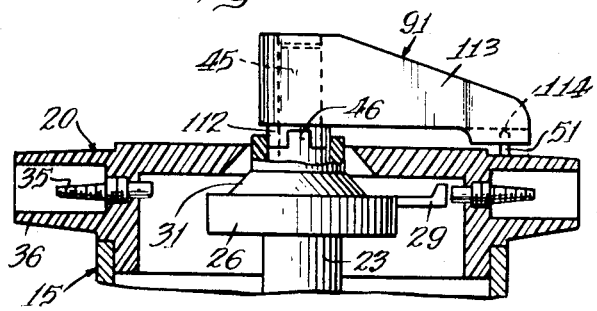
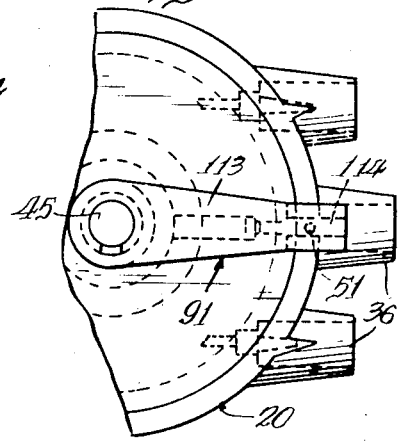
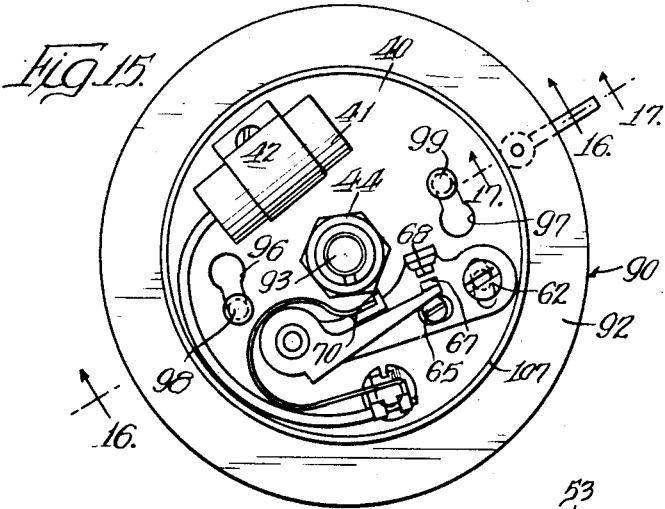
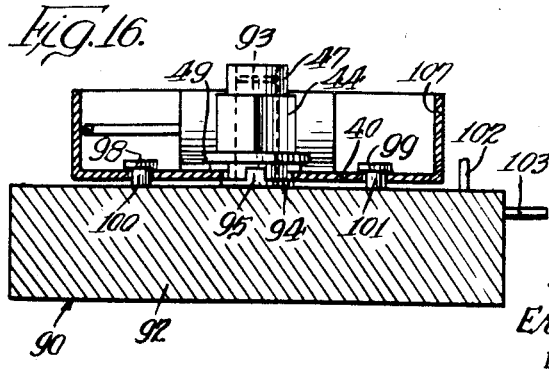
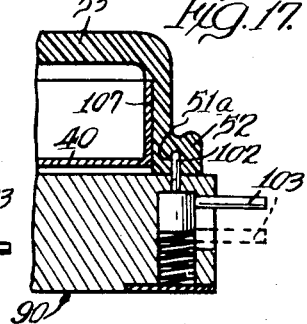

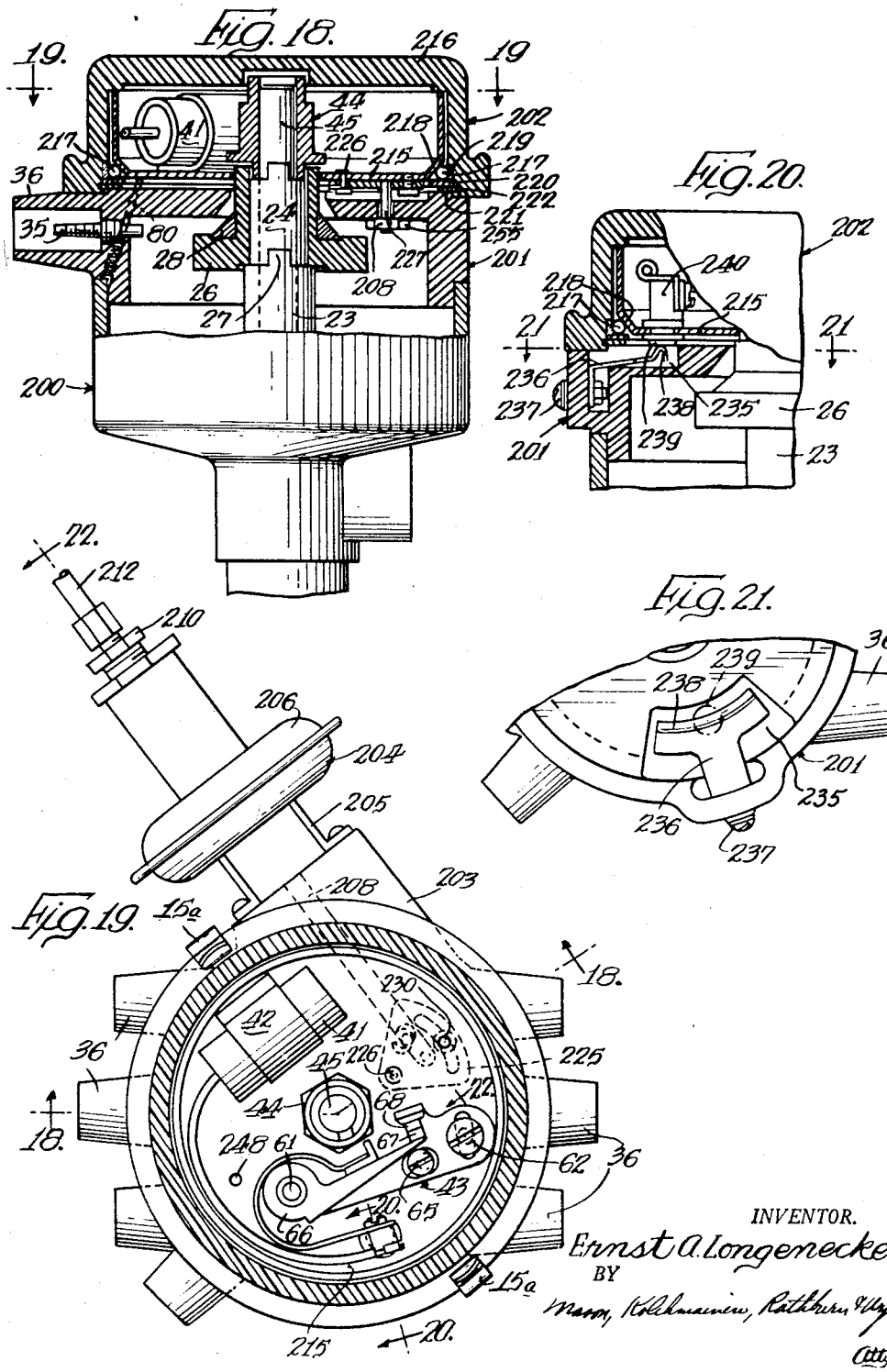

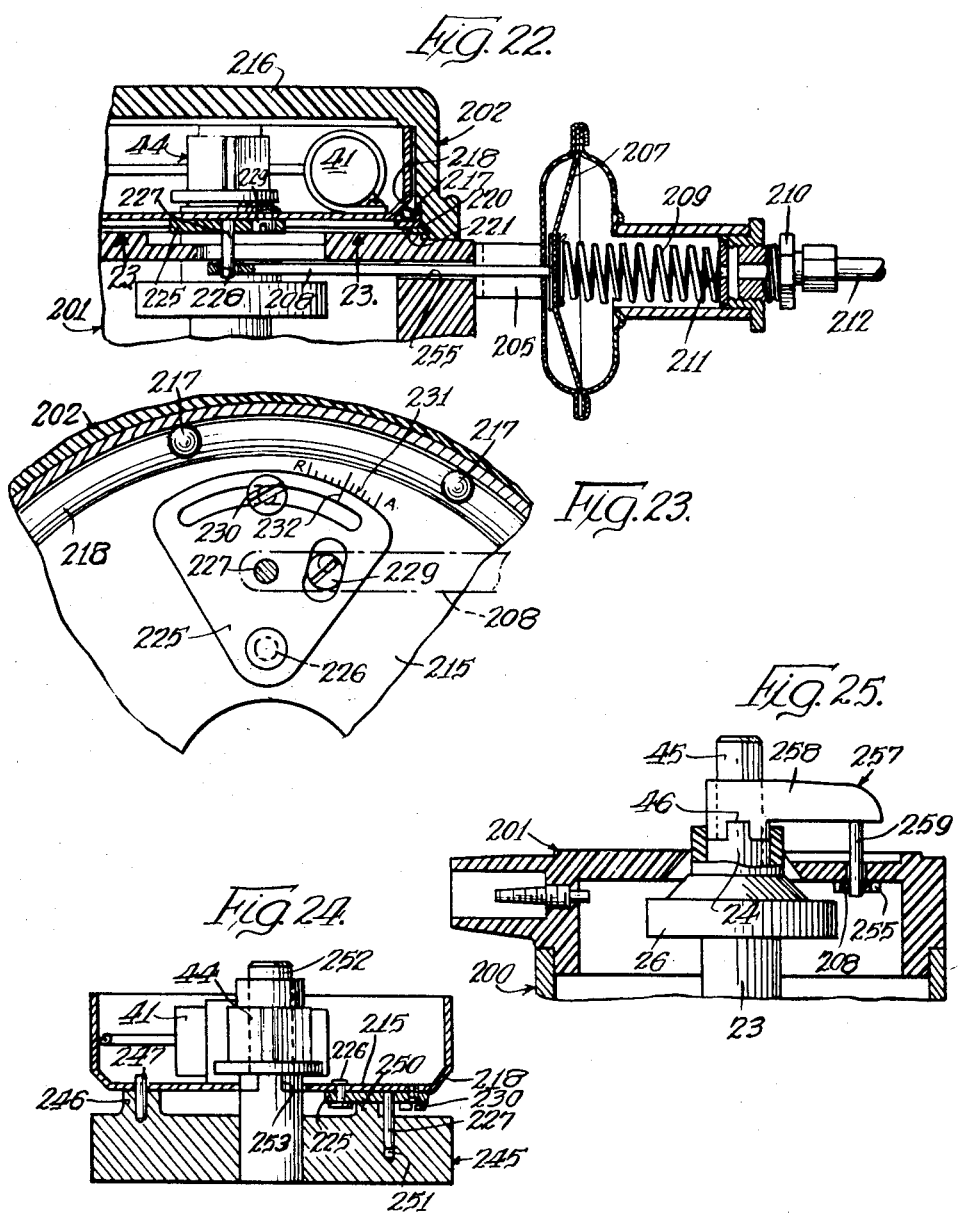

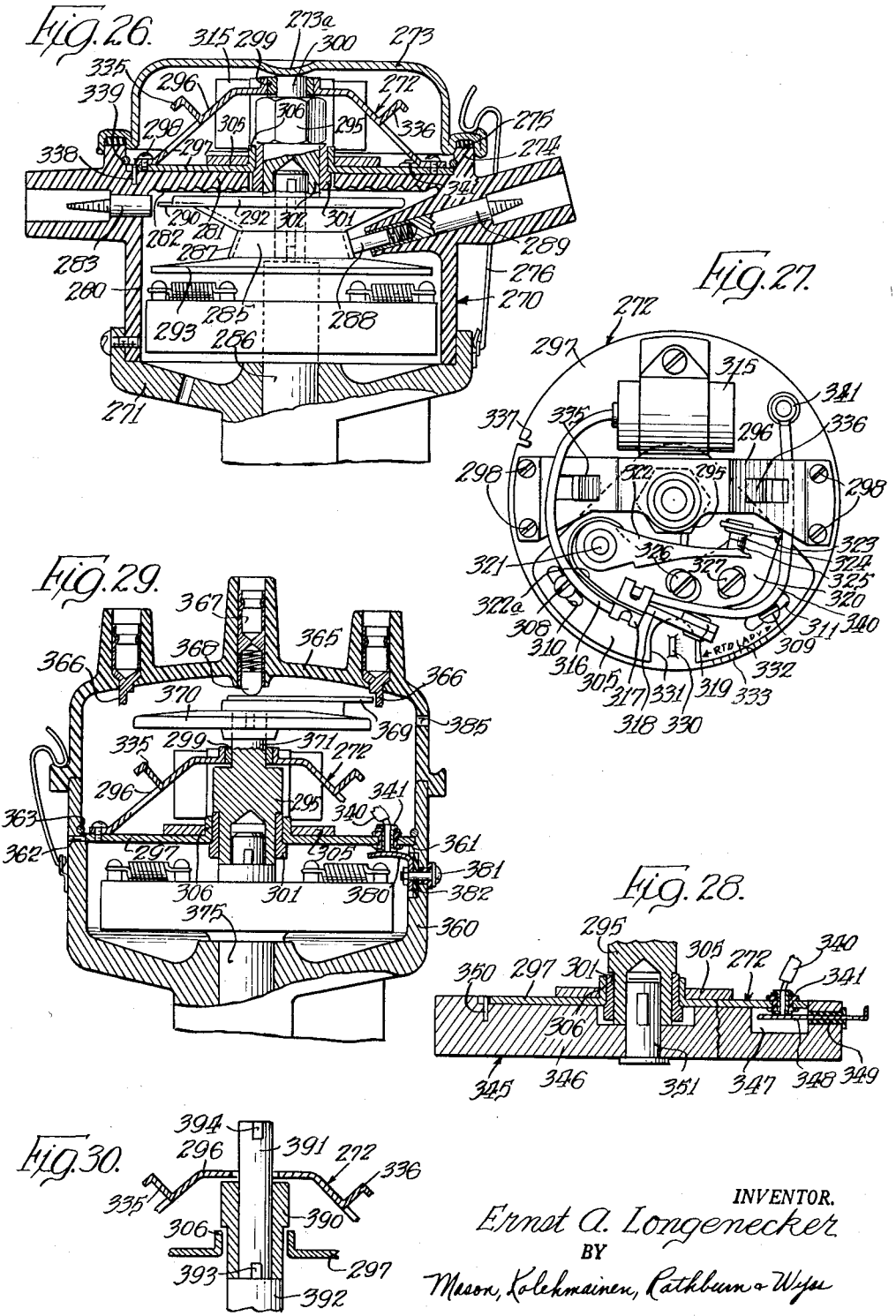

United States Patent Office 2,923,785
Patented Feb. 2, 1960

2,923,785
ENGINE DISTRIBUTOR AND METHOD OF ADJUSTMENT THEREOF

Ernst A. Longenecker, Jackson, Mich.

Application January 21, 1954, Serial No. 405,288

27 Claims. (Cl. 200—31)

The present invention relates to engine ignition systems, and, more particularly, to an engine distributor arrangement wherein at least a part of the primary ignition circuit is contained in a separate unit which is readily accessible and can be replaced by a similar unit without the aid of any tools or other equipment. Specifically, the present invention is a continuation-in-part of my copending application, Serial No. 366,909, filed July 9, 1953, now abandoned.

In engine ignition systems the breaker points and condenser, which form a part of the primary ignition circuit, are continually wearing out and have to be replaced many times during the lifetime of the average engine. Conventionally, these components are positioned beneath the secondary circuit of the distributor and it requires considerable skill and special tools to repair or replace either the condenser or the breaker points. Furthermore, the breaker points have to be adjusted to the correct gap setting after they are installed in the distributor. Accordingly, this work is usually done by a garage man and considerable time may be lost in obtaining the service necessary to replace the worn out condenser or points and place the engine back in service. This is particularly true in the case of long truck hauls in which case these components may fail at some remote part of the country or at night when it is impossible to get a garage man for several hours and valuable time is lost. This is also particularly important in the case of military vehicles where a breakdown of the engine for any length of time may cause considerable difficulty or even loss of life and equipment. Accordingly, it would be desirable to provide a standardized, replaceable timing unit which includes the condenser and breaker points and may be readily removed without the aid of any tools and may be replaced by a similar unit which has been pretimed so that no further adjustment of the unit is necessary and no individual electrical connections need be made to place the engine back in service. With such an arrangement costly downtime while waiting for a serviceman is avoided and in the case of military vehicles the feature of making accurate repairs in a matter of a few seconds may easily result in saving lives and costly equipment.

In certain other instances, it is particularly important to provide an engine distributor arrangement which is as dustproof as possible so that the breaker points do not become fouled by dust and dirt carried in the air. However, this requirement is complicated by the fact that arcing in the secondary circuit portion of the distributor produces ozone which is also harmful to the breaker points and other electrical components so that the secondary circuit of the distributor must be vented for free circulation of air with the result that in conventional distributors dust laden air can readily enter the breaker point portion of the distributor and interfere with the proper operation of the breaker points.

It is, therefore, a primary object of the present invention to provide a new and improved engine ignition system wherein a replaceable timing unit including at least a part of the primary ignition circuit is positioned on the engine distributor in such manner as to be readily accessible and may be removed as a unit by the average operator without the use of any tools or other equipment and may be replaced by a similar unit which is pretimed for correct engine operation.

These units are termed replaceable because each is adapted to take the place of, or to serve as a substitute for, another. Each unit is preset to operate in the same timed relation with the engine so that one may replace another on the engine without further adjustment.

It is another object of the present invention to provide a new and improved engine ignition system and method of adjustment thereof wherein a preadjusted, readily replaceable timing unit is provided which contains a portion of the primary ignition circuit including a part driven by the engine, such as a cam, and other parts which are relatively stationary, such as a mounting on which the breaker points are positioned for operation by the cam. The driven and stationary parts have indexing means by which the unit may be pretimed or preset. Likewise, indexing means is provided on the distributor body and engine driven camshaft. Any unit, when preset by use of the indexing means thereon, may then be exactly positioned in the ignition system so as to function like any other unit. In other words, the units are readily replaceable, one by another, without necessitating adjustments to the unit after it is placed in the engine ignition system.

It is still another object of the present invention to provide a new and improved engine ignition system which may be employed with different types of vacuum advance mechanisms and wherein a preadjusted, readily replaceable timing unit is provided which contains a portion of the primary ignition circuit.

It is a further object of the present invention to provide a new and improved timing unit for an engine distributor wherein the circuit making and breaking means and associated condenser may be assembled and adjusted as a separate operation in such manner that the timing unit will give correct operation without further adjustment after assembly on the engine.

Another object of the present invention resides in a new and improved breaker point timing unit wherein means are provided for making quick and positive adjustment of the breaker points to a standard factory setting while permitting adjustment of the timing after the unit is assembled on an engine to accommodate local conditions.

Still another object of the present invention resides in the provision of a new and improved engine ignition system wherein the primary ignition circuit parts are positioned outside the secondary ignition circuit on the distributor body so that the primary ignition parts may be removed as a unit without disturbing the high voltage portion of the ignition system.

A further object of the invention resides in the provision of a new and improved engine ignition system wherein the primary ignition circuit parts are located in a dustproof housing above the secondary ignition circuit on the distributor body so that the primary ignition parts may be readily removed as a unit, the primary ignition parts being pretimed for correct breaker point operation without further adjustment after assembly on the engine.

A still further object of the invention resides in the provision of a pretimed, readily replaceable breaker point unit for an engine distributor which is substantially completely enclosed to prevent dust and dirt from affecting the operation of the breaker points.

It is another object of the present invention to provide a new and improved engine ignition system wherein a portion of the primary ignition circuit and the ignition coil are removable as a unit and all electrical connections to the unit are automatically established by positioning the unit on the distributor.

It is a further object of the present invention to provide a new and improved engine ignition system in which the spark coil, the primary ignition circuit and the secondary ignition circuit are all provided in the form of readily replaceable plug in units any one of which may be removed and replaced upon failure thereof without disturbing other portions of the ignition system.

It is still another object of the present invention to provide a new and improved engine ignition system in which ignition troubles may be readily corrected by unskilled persons in a minimum amount of time and without the necessity of accurate mechanical adjustment after installation.

The invention, both as to its organization and method of operation, together with further objects and advantages thereof, will best be understood by reference to the following specification taken in connection with the accompanying drawings, in which:

Fig. 1 is a side elevational view of a distributor embodying the principles of the present invention with a portion thereof broken away to show the details thereof;

Fig. 2 is a sectional plan view of the distributor of Fig. 1 taken along the lines 2—2 of Fig. 1;

Fig. 3 is a fragmentary side elevational view of the top portion of the distributor Fig. 1 showing the retard-advance timing scale thereof;

Fig. 4 is a fragmentary side elevational view, partly in section, of the top portion of the distributor of Fig. 1 and taken along the line 4—4 of Fig. 2;

Fig. 5 is a plan view of the distributor of Fig. 1 with the replaceable timing unit thereof removed;

Fig. 6 is a side elevational view, partly in section, of the distributor of Fig. 1, taken along the line 6—6 of Fig. 5;

Fig. 6A is a fragmentary bottom view of the replaceable timing unit of the distributor shown in Fig. 1 and illustrating a different retard-advance scale arrangement thereon;

Fig. 7 is a side elevational view, partly in section, of an alternative embodiment of the invention wherein the spark coil is positioned atop the distributor unit;

Fig. 8 is a sectional plan view of the distributor shown in Fig. 7 taken along the line 8—8 thereof;

Fig. 9 is a side elevational view, partly in section, of the distributor shown in Fig. 7 and taken along the line 9—9 of Fig. 8;

Fig. 10 is a fragmentary side elevational view, partly in section of another alternative embodiment of the invention showing the details of the connection to the spark coil unit;

Fig. 11 is a side elevational view of the distributor of Fig. 1, and illustrating a different retard-advance scale arrangement thereof;

Fig. 12 is a schematic diagram of the electrical circuit arrangement of the distributor of Fig. 7;

Fig. 13 is a sectional side elevational view of a portion of the distributor of Fig. 1 and showing an alignment fixture used initially to position the distributor with respect to the distributor drive shaft of the engine;

Fig. 14 is a fragmentary plan view of the distributor and fixture arrangement shown in Fig. 13;

Fig. 15 is a plan view of a sub-asembly unit on which the replaceable timing unit of the distributor of Fig. 1 may be asembled and adjusted;

Fig. 16 is a sectional side elevational view of the sub-assembly unit of Fig. 15 taken along the line 16—16 thereof;

Fig. 17 is a fragmentary sectional side elevational view of the sub-assembly unit of Fig. 15 taken along the line 17—17 thereof;

Fig. 18 is a side elevational view partly in section, of a further alternative embodiment of the invention wherein the distributor vacuum connection is made directly to the replaceable timing unit;

Fig. 19 is a sectional plan view of the distributor shown in Fig. 18 taken along the line 19—19 thereof;

Fig. 20 is a fragmentary side elevational view, partly in section, of the distributor of Fig. 18 and taken along the line 20—20 of Fig. 19;

Fig. 21 is a fragmentary plan view of the distributor of Fig. 18 and taken along the line 21—21 of Fig. 20;

Fig. 22 is a fragmentary sectional side elevational view of the distributor of Fig. 18 taken along the line 22—22 of Fig. 19;

Fig. 23 is a fragmentary bottom view of the distributor of Fig. 18 taken along the line 23—23 of Fig. 22;

Fig. 24 is a sectional side elevational view of a sub-assembly unit on which the replaceable timing unit of the distributor of Fig. 18 may be assembled and aligned;

Fig. 25 is a sectional side elevational view of a portion of the distributor of Fig. 18 and showing an alignment fixture used initially to position the distributor body with respect to the distributor drive shift of the engine.

Fig. 26 is a side elevational view, partly in section, of an alternative embodiment of the invention wherein the breaker point cam segment is rotatably mounted in the replaceable breaker point timing unit;

Fig. 27 is a plan view of the embodiment shown in Fig. 26;

Fig. 28 is a side elevational view of an alignment fixture for pretiming the replaceable timing unit of Fig. 26;

Fig. 29 is a side elevational view, partly in section, of another alternative embodiment of the invention wherein the replaceable, pretimed breaker point unit is positioned beneath the secondary circuit parts of the distributor; and Fig. 30 is a fragmentary side elevational view of an embodiment similar to that shown in Fig. 29 but with the breaker point cam segment mounted directly on the distributor drive shaft.

Referring now to the drawings and more particularly to the embodiment shown in Fig. 1 thereof, the engine distributor of the present invention is therein illustrated as comprising a distributor body, indicated generally at 15, which is provided with a conventional shank portion 16 adapted to be mounted in the engine proper and a mounting flange portion 17 which is adapted to be connected to the block through a suitable vacuum advance mechanism (not shown) so that the distributor body 15 may be correctly positioned with respect to the drive shaft 18 for properly timed operation of the engine. The drive shaft 18, which is journaled within the distributor body 15, is adapted to be connected to the main timing shaft of the engine through the gear 19. The distributor body 15 supports at the upper end thereof, a secondary circuit housing member of insulating material, indicated generally at 20, and a replaceable timing unit indicated generally at 21, the unit 21 being positioned on the upper surface of the secondary circuit housing member 20. The units 20 and 21 are held in assembled relation on the distributor body 15 by means of the clips 15a in the conventional manner. Also the unit 20 may be secured to the distributor body 15 by means of the screws 20a to prevent rotation thereof relative to the distributor body 15 and to provide for standard positioning of the unit 20 on the body 15 for reasons to be described in more detail hereinafter.

Within the distributor body 15 there is provided a conventional centrifugal governor mechanism for automatic advance in ignition timing proportional to engine speed, indicated generally at 22, which includes a sleeve portion 23 which is positioned on and is movable with respect to the drive shaft 18. The governor mechanism 22 functions to advance or retard the sleeve 23 with respect to the position of the drive shaft 18 as the speed of the drive shaft varies, as will be well understood by those skilled in the art. The sleeve 23 is provided with an upper portion 24 of reduced diameter which forms the seat 25 on which is positioned a rotor hub 26 of insulating material, the hub 26 being provided with a keyway adapted to receive the key 27 formed in the lower portion of the sleeve 23 so that the hub 26 is drivingly connected to the sleeve 23. The hub 26 is provided with an annular contact member 28 having a projecting arm portion 29 the end of which is adapted to form a spark gap with any one of a plurality of spark gap electrodes 30 positioned in the side wall of the housing member 20. The contact 28 is provided with a conical upper surface 31 on which the brush 32 rides so that the high tension voltage, which is connected to the stud 33 (Fig. 4), is conveyed over the conductor 34 embedded in the upper wall of the housing 20, through the brush 32, and the electrodes 30 to the individual spark plugs of the engine as the distributor shaft 18 is rotated. The spark gap electrodes 30 are preferably provided with screw thread portions 35 which are surrounded by the projecting sleeves 36 extending radially outwardly from the side wall of the housing 20 so that a high voltage conductor may conveniently be connected to each electrode by simply threading the end of the conductor over the screw thread portion of the electrode so as to make electrical contact therewith. However, it will be understood that any other suitable secondary circuit electrode arrangement may be employed insofar as the present invention is concerned.

The replaceable timing unit 21 comprises a metallic mounting plate 40 which, in the illustrated embodiment is generally cup-shaped and on which there is positioned the condenser 41, which is secured to the plate 40 by means of the mounting bracket 42, the breaker point assembly indicated generally at 43 and the breaker point actuating cam member indicated generally at 44. When the unit 21 is correctly positioned on top of the housing 20, the cam member 44 is positioned on the upper end 45 of the drive shaft 18 and is keyed to the upper end 24 of the sleeve 23 by means of a key 46 so that the cam member 44 is directly keyed to and rotates with the sleeve 23 as the drive shaft 18 is rotated. The upper end 47 of the cam member 44 is of reduced diameter so as to be received within a recess 48 in the top wall of a cover 53, which protects the components carried by the mounting plate 40, and the member 44 is provided with a flange portion 49 which is somewhat larger than the opening 50 in the bottom wall of the mounting plate 40 so that the member 44 is loosely held within the unit 21 when this unit is lifted off of the housing member 20. With this arrangement, the cam member 44 may be readily inserted over the upper end 45 of the drive shaft 18 and may be keyed to the sleeve 23 by simply inserting the bottom end of the cam member over the drive shaft portion 45 and rotating the same until the key 46 is engaged. Furthermore, the play afforded by the separation between the upper portion 47 and the recess 48 permits the unit 21 to be rotated after the cam member 44 is secured to the sleeve 23 until the locating pin 51, which is positioned in the upper wall of the housing member 20 and projects upwardly therefrom, is received in a cooperating locating hole 51a in the flange portion 52 of the cover 53. In this connection, it will be noted that the housing member 20 is provided with an annular rim 54 on the upper surface thereof which is adapted to receive the bottom edge of the cover 53 so that the unit 21 is concentrically positioned on the housing member 20 when the pin 51 is in engagement with the corresponding opening 51a in the flange 52. Accordingly, the breaker point assembly 43 in the unit 21 is correctly positioned for proper breaker point actuation as will be described in more detail hereinafter.

In this modification of the invention, the replaceable unit may be considered as the plate 40 and parts mounted thereon, including the cam, which parts are described in detail below. Alternatively, the replaceable unit may be considered the housing 21, plate 40, and parts mounted thereon, including the cam.

Considering now, the details of the breaker point assembly positioned on the mounting plate 40, this assembly includes a breaker arm mounting bracket 60 which is pivotally supported on the plate 40 by means of the stud 61 and may be locked in position by means of the screw 62 which extends through the slot 64 in the mounting bracket 60, an adjustment cam screw 65 being provided to adjust the position of the mounting bracket for correct breaker point spacing. Also pivotally supported on the stud 61 and insulated therefrom is the breaker arm 66 which carries at the outer end thereof one of the breaker point contacts 67, the other breaker point contact 68 being supported on an upstanding tab 69 of the mounting bracket 60. The breaker arm 66 is controlled by means of the cam follower 70 of insulating material which is spring biased against the edge of the cam member 44 by means of the spring 71, the other end of which is secured to the mounting post 72 by means of the screw 73. One side of the condenser 41 is grounded to the plate 40 through the bracket 42 and the other side of this condenser is connected through the conductor 74 to the mounting post 72 by means of a mounting lug 95a.

In order to establish an electrical circuit to the components in the unit 21 without making individual electrical connections after the unit 21 is in place, there is provided cooperating contact means on the unit 21 and the distributor body 15 which establish an electrical circuit to the breaker arm 66 and the condenser 41 in the unit 21 when this unit is correctly positioned on the distributor body 15 in the manner described above. More particularly, the mounting post 72 is insulated from the mounting plate 40 by means of the insulating washers 76 and 77 (Fig. 6) and is provided with an enlarged head portion 78 which is adapted to extend into a recess 79 formed in the upper surface of the housing member 20 and to engage a spring contact member 80 which is secured to the side wall of the housing member 20 by means of the terminal screw 81. Electrical connection from the primary of the spark coil may then be made by means of an external conductor which is permanently connected to the terminal screw 81 by means of a suitable mounting lug or the like. Accordingly, when the unit 21 is correctly positioned on the distributor body 15, and more particularly the insulating housing 20 thereof, the head portion 78 of the mounting post 72 is electrically connected through the spring contact 80 and the terminal screw 81 to the spark coil so that the primary circuit of the ignition system is established to the mounting plate 40. However, it is also necessary to connect the mounting plate 40 to the distributor body 15 and through this body, to the frame of the vehicle to complete the primary circuit to battery. For this purpose there is provided a contact pin 80a (Fig. 6) which is positioned within an opening 81a which extends transversely through the housing member 20 so as to communicate at the upper end thereof with the mounting plate 40 and at the bottom end thereof with the upper edge of the distributor body 15. The pin 80a is provided with a head portion 82 and a spring 83 is positioned between the head 82 and a contact member 84 adapted to engage the inner rim of the upper edge of the distributor body 15. Accordingly, the pin 80a is urged upwardly into contact with the under side of the mounting plate 40 when the unit 21 is properly positioned and this plate is electrically connected through the pin 80a, the spring 83 and the contact member 84 to the distributor body 15 so that the mounting plate 40 is effectively connected to frame. In this connection, it will be understood that any other suitable contacting means may be provided for connecting the mounting plate 40 to the distributor body 15 to provide the above described ground connection.

Considering now the operation of the above described distributor unit, and assuming that the parts thereof have been correctly adjusted in a manner to be described in more detail hereinafter, as the distributor shaft 18 rotates the hexagonal cam member 44 is also rotated therewith under the control of the retard-advance mechanism 22 and as the cam follower 70 engages each ridge on the cam member 44, the breaker arm 66 is actuated sufficiently to break the primary circuit by opening the points 67 and 68. When this occurs, an electrical pulse is developed in the secondary of the spark coil, is supplied to the terminal 33, through the conductor 34, the brush 32 and the rotor member 29 to the adjacent spark gap electrode 30 and is supplied to one of the spark plugs of the engine. Proper operation is determined by exact relationship between the stationary and movable parts of the replaceable unit and the exact relationship between these parts and supporting or driving parts on the engine distributor. This result is accomplished in the second instance by inter-engaging or indexing parts between the cam and shaft and inter-engaging or indexing parts on the unit and on the part of the distributor upon which the unit is mounted. Socket 51a determines the angular relation between cap 53 and housing 20. The angular relation between cap 53 and plate 40 is determined by the index markings 108 and 109, later to be described. The cam 44 of the timing unit is indexed both concentrically and angularly with respect to the shaft 23 by the shaft portion 45 and the key 46. This serves to locate the timing unit concentric with the shaft 45. As the mechanism 22 changes the relationship of the sleeve 23 with respect to the distributor shaft 18, the timing of the above described circuit opening operation is correspondingly advanced or retarded. When the points 67 and 68 close, the condenser 41 is connected to ground through the bracket 60, the mounting plate 40, the pin 80 and the contact 84 to the distributor body 15 so that this condenser is discharged and is ready for the next cycle of operation when the cam follower 70 engages the next ridge on the cam member 44.

From the foregoing description of the operation of the replaceable timing unit 21, it will be understood that unless the breaker point assembly 43 is correctly adjusted, the timing of the unit will be incorrect and it will be necessary to adjust the point spacing with special tools and equipment. Furthermore, it will be noted that the cam member 44 is loosely positioned within the unit 21 when this unit is not in operation so that its adjustment thereof cannot readily be made on the unit per se. To obviate the necessity of adjusting the breaker points once the unit 21 is in place and to provide a pretimed, replaceable unit which may be installed by the average car owner without the use of any tools or other equipment to make the necessary breaker point adjustments, the replaceable unit 21 is assembled and adjusted as a separate sub-assembly and means are provided for adjusting the relative position of the distributor body and distributor drive shaft of a particular engine so that the pretimed units will all function correctly without individual adjustment after they are installed on the distributor of an adjusted engine. More particularly, there is provided a sub-assembly mounting fixture, or jig, indicated generally at 90 in Figs. 15, 16 and 17, for the initial adjustment of the unit 21, and there is also provided a mounting fixture, or jig, indicated generally at 91 in Figs. 13 and 14, which is employed to adjust the distributor body of a particular engine with respect to the distributor drive shaft thereof so that any one of the units adjusted by means of the fixture 90 will operate satisfactorily in the engine after it is adjusted in accordance with the fixture 91.

Referring first to the fixture 90, this sub-assembly comprises a base member 92 which is provided at the center thereof with a fixed shaft 93, having a portion of larger diameter 94 provided with a key 95 which simulates the upper end of the sleeve 23 of the distributor shown in Fig. 1. The base 92 also supports a depressible pin 102 which is positioned in predetermined relation with respect to the key 95 and may be depressed below the surface of the base member 92 by means of the handle member 103. The shaft 93 is of the correct length to simulate the extending portion 45 of the distributor drive shaft 18 shown in Fig. 1 so that the mounting plate 40 of a particular timing unit may be positioned on the base 92 and a cam member 44 inserted over the shaft 93 and engaged with the key 95.

In order to position the mounting plate 40 concentrically with the shaft 93 while permitting the unit to be removed once it is adjusted, there is provided the bayonet slots 96 and 97 in the mounting plate 40, the enlarged portions of which are adapted to receive the head portions 98 and 99 of a pair of locating pins 100 and 101 which are fixedly supported in the base 92. With this arrangement, the mounting plate 40 is positioned with the enlarged openings of the slots 97 and 96 over the head portions of the locating pins 100, and 101 and this plate is thereafter rotated so as to bring the head portions 98 and 99 over the narrow portions of these slots so that the mounting plate 40 is concentrically positioned with respect to the shaft 93 and is in a predetermined relation with respect to the base member 92. In this position the cam member 44 will occupy a given position, as shown in Fig. 15, wherein the cam follower 70 engages a ridge on the cam member 44, in which position the breaker points 67 and 68 have a maximum opening. If this opening is not correct, the adjustment cam screw 65 may be rotated to give the required spacing between the breaker points.

As an alternative arrangement in adjusting the setting of the breaker points 67 and 68, the relative position of the shaft 93 and the locating pins 100 and 101 may be so chosen that when a timing unit is positioned on the fixture 90 the cam follower 70 does not engage one of the ridges on the cam member 44 (as shown in Fig. 15) but instead engages the member 44 at a predetermined point in between the ridges of the member 44 such that the breaker points 67 and 68 should be just closed or opened at this point in the timing cycle. A low voltage light circuit (not shown) may then be employed, one terminal of which is connected by a suitable clip lead to the mounting post 72 and the other terminal of which is connected to the mounting plate 40 to provide the ground connection. The points 67 and 68 can then be adjusted and set to the exact point at which the light either goes on or goes off when the points just open or close during adjustment of the cam screw 65. At this position the points 67 and 68 will be correctly adjusted so that they open the required distance when the cam follower 70 engages one of the ridges of the cam member 44 during actual operation of the distributor. Furthermore, the above described adjustment does not require shim measurement of the breaker point spacing and may be done on an assembly line basis, as will be readily understood by those skilled in the art.

After the breaker point assembly 43 has been adjusted in the manner described above, the cover plate 53 of the unit 21 is then placed over the cup-shaped mounting plate 40 and is rotated with respect to this mounting plate until the pin 102, which corresponds to the locating pin 51 on the secondary circuit housing member 20 of the distributor shown in Fig. 1, is positioned within the cooperating opening 51a provided in the flange 52 of the cover 53, in which position the pin 102 may enter this opening and the cover is positioned correctly with respect to the mounting plate 40.

The exact relationship between the stationary and movable parts of the replaceable unit depends upon exact location of the unit on the timing fixtures above described. This exact location is determined by cooperating indexing means on the unit and on the fixture. Indexing pins 100 and 101 locate the unit 40 concentric with the stub shaft 93 and determine the precise angular position between the unit 40 and key 95. The shaft 93 and its key 95 index the position of the cam 44 concentrically and angularly with respect to cam follower 70 and support 40. Pin 102 and socket 51a index the position of the cap 53 with respect to the stationary and movable timing parts with which it is later assembled. All the parts are thereby accurately located concentrically and angularly.

In order to secure the cover and mounting plate together in the correct relationship after the points have been adjusted in the manner described above, there is provided the screw 105 (Fig. 2) the shank portion of which extends through a curved washer member 106 and through a registering slot in the side wall of the cover 53 and is threaded into the side wall 107 of the cover plate 40. The washer 106 is provided with a single alignment mark, or indication 108 which cooperates with a retard-advance scale 109 inscribed by any suitable means on the cover 53, and, in the adjustment position shown in Fig. 16 the parts are so arranged that the mark 108 falls in the center of the retard-advance adjustment sacle 109. Accordingly, when the cover 53 is correctly positioned by means of the locating pin 102, the screw 105 is tightened so as to secure the mounting plate 40 to the cover 53, these members thereafter acting as an integral unit which is completely enclosed to protect the electrical components of the unit. Furthermore, the timing unit is adjusted to a standard factory setting as indicated by the scale 109 and the alignment mark 108 so that all units will be pretimed to the same standard factory setting. In this connection it will be understood that the mark 108 may either be pre-stamped on the washer 106, or, if the tolerances of the parts prevent prestamping, the mark 108 may be inscribed on the washer 106 after the timing unit has been adjusted to the standard factory setting.

After the cover 53 has been secured to the mounting plate 40, the pin 102 is depressed by means of the handle 103 to the position 110 shown in dotted lines in Fig. 17, in which position the upper end of the pin 102 is moved free of the opening 51a in the cover 53, and the unit 21 may thereafter be rotated sufficiently to move the head portions 98 and 99 of the locating pins 100 and 101 into the enlarged openings of the slots 96 and 97 so that the unit may be removed from the adjustment fixture 90. After the unit 21 has been adjusted to the standard factory setting in the manner described above, the timing thereof may be changed in the field by loosening the screw 105 and shifting the cover 53 relative to the plate 40, the change in position of these members being indicated by the scale 109 and marker 108. Accordingly, the timing of the unit 21 may be adjusted as desired to adapt to local conditions without the use of special tools or equipment and by means of a simple screwdriver adjustment which can be made by anyone. Furthermore, the timing of the unit 21 can be returned to the standard factory setting again by merely realigning the mark 108 with the centerline of the scale 109. While the retard-advance scale arrangement shown in Fig. 3 is particularly suited for an arrangement wherein the cover 53 is opaque, it will be understood that other suitable scale arrangements may be provided. For example, if the cover 53 is transparent the sacle arangement shown in Fig. 11 may be employed wherein the retard-advance scale 116 may be inscribed on the side of the mounting plate 40 and is visible through the cover 53, an alignment mark 117 being inscribed on the side of the cover 53 to permit adjustment of registration between the members 40 and 53. In the alternative, the arrangement shown in Fig. 6A may be employed wherein the retard-advance scale 118 is inscribed on the bottom edge of the cover 53 and the alignment mark 119 is provided on the bottom of the mounting plate 40.

In order to adjust a particular engine so that it will function properly with one of the units 21 which has been pretimed by means of the above described adjustments, the mounting jig or fixture 91 is employed. With the unit 21 removed from the distributor body, the fixture 91 is first inserted over the upper end 45 of the distributor shaft 18 and the fixture 91 is provided with a sleeve 112 which is adapted to receive the key 46 in the same manner that the cam member 44 receives this key when the unit 21 is positioned on the distributor body. The fixture 91 is provided with an extension arm 113 which extends outwardly from the shaft 45 and is provided with a downwardly opening slot 114 which is positioned in the same relation to the key 46 as the pin 102 is positioned with respect to the key 95 in the mounting fixture 90. With the flywheel of the engine positioned so that the timing mark thereon is set to the alignment position and with the distributor body 15 disconnected from or loosely connected to the vacuum adjustment so that the body 15 may be adjusted relative thereto, the fixture 91 is held, so as to take up all backlash in the gearing of the engine, and the distributor body 15 is then rotated bodily while holding the fixture 91 firmly until the locating pin 51 is moved into the slot 114 in the fixture 91. When this occurs, the distributor drive shaft and distributor body have the same predetermined relation as that set up on the mounting fixture 90, and the distributor body is then locked in this position by tightening the conventional vacuum adjustment mechanism which fixedly positions the distributor with respect to the block of the engine. In the alternative, the fixture 91 may be positioned so that the pin 51 engages the slot 114 in the arm 113 by rotating the distributor body 15 with the drive shaft 18 on the timing mark and after the pin 51 engages the slot 114 the distributor body may be urged in the correct direction to take up all play and backlash in the gearing and locked in this position.

When the distributor body 15 and the distributor drive shaft 18 are located in the above described manner by employing the fixture 91, these parts are so positioned that any one of a number of pretimed units 21 may be positioned upon the distributor body 15 with the pin 51 in the housing 20 positioned within the opening 51a in the cover 53 of the unit and the unit will be timed for correct breaker point actuation without any further mechanical adjustment of the breaker points or the other portions of the unit. It will, therefore, be evident that the present invention provides a pretimed, replaceable unit which may be readily removed without disturbing the secondary circuit portions of the ignition system and may be replaced by a similar unit, which may be kept in the glove compartment of the car, for example, this replacement unit being automatically positioned on the distributor body by simply locating the cover 53 in engagement with the pin 51 and snapping the clips 15a in place so that the components are held securely together.

Since the primary ignition parts are substantially completely enclosed, a dustproof unit is provided even though the secondary circuit parts are vented to the outside air to release the ozone produced by arcing in the secondary circuit. Furthermore, the arrangement of the present invention may be substantially cheaper to manufacture since the cam segment 44 need not be machined as an integral part of the distributor drive shaft but may be a length of simple hexagonal stock which is machined separately to the correct dimensions. It will also be evident that the arrangement of the present invention offers a convenient means of repairing the worn out condenser and breaker point components since the unit which is removed may then be sent to the manufacturer and the worn out components replaced after which the repaired unit may be used again without requiring any mechanical adjustment thereof. Furthermore, with this arrangement the breaker points and condenser may be removed and replaced without any of the labor costs normally involved in such operations. It will also be noted that the secondary circuit housing member 20 may be removed as a unit by removing the screws 20a so that this unit may be replaced independently of the breaker point assembly unit 21 if a failure occurs in the unit 20.

In Figs. 7, 8 and 9 of the drawings, there is illustrated an alternative embodiment of the present invention wherein the replaceable timing unit includes the ignition or spark coil of the ignition system so that the spark coil and the condenser and breaker point units are replaceable either as a unit or independently of each other. Referring to these figures, the condenser and breaker point unit is indicated generally at 120, the spark coil unit is indicated generally at 121, and the secondary circuit housing member is indicated generally at 122. The distributor body 15, the advance-retard mechanism 22 and the rotor hub 26 are all substantially identical to corresponding parts of the distributor shown and described in detail in Fig. 1. However, in the member 122 connection to the brush 32 is made by providing the housing member 122 with an upstanding sleeve 123 of insulating material within which there is positioned a contact receptacle 124 adapted to receive the pin contact portion 125 of an insulated secondary lead 126 of the spark coil unit 121, a conductor 131 which is embedded in the member 122 being employed to connect the contact 124 with the brush holder and brush 32. The unit 122 is also provided with means for establishing an electrical circuit connection to the primary winding of the spark coil positioned in the unit 121, through the unit 120. More specifically, the housing member 122 is provided with a channel 150 in the top wall thereof and a spring contact member 151 is positioned within the channel 150 and is adapted to engage the bottom head portion 152 of a contact stud 153 which is positioned on the mounting plate 127 in the unit 120 and is insulated therefrom by means of the insulating washers 154 and 155. The other end of the spring contact member 151 is connected to the terminal screw 156 positioned in the side wall of the unit 122 so that a low voltage connection can be made by connecting a suitable terminal lug under the head of the screw 156. The stud 153 is provided with a top contact plate portion 157.

The condenser and breaker point unit 120 is provided with the mounting plate 127 which is similar in many respects to the mounting plate 40 of the distributor of Fig. 1. However, the plate 127 is provided with a clearance opening 127a for the sleeve 123 of the member 122 and is provided with the contact stud 153. Also, the unit 120 is provided with a cover member 128 which is provided with the locating aperture 129, which corresponds to the locating aperture 51a in the cover 53 of the distributor shown in Fig. 1, and is adapted to receive the locating pin 130 which is embedded in and projects upwardly from the upper wall of the member 122.

The spark coil unit 121 is provided with a housing 135 of insulating material, within which the spark coil is positioned, and the common primary and secondary lead 136 of the spark coil is electrically connected through the spring 137 and the contact pin 138 to a contact plate 140 positioned on the upper end of the breaker spring mounting post, 139. The other primary lead 160 of the spark coil is electrically connected through the spring 161 and the contact pin 162 to the top surface of the contact plate 157 when the units 120, 121 and 122 are assembled in the manner shown in Fig. 9. The high voltage conductor 126 of the spark coil extends downwardly from the housing 135 and is protected by the sleeve portion 142 thereof. In a similar manner, the spring biased contact pins 138 and 162 are supported in and protected by the sleeves 143 and 165, respectively, which extend downwardly from the bottom of the housing 135. The housing 135 is arranged to fit over the top of the unit 120 and is provided with a groove 144 which is adapted to receive the ends of mounting clips which are attached to the distributor body so that the units 120, 121 and 122 are held in assembled relation on top of the distributor body 15. Clearance holes for the terminals of the unit 121 are provided in the top wall of the cover member 128 of the unit 120. Thus, the clearance hole 166 (Fig. 7) is provided for the sleeve portion 142, the clearance hole 167 (Fig. 9) is provided for the sleeve portion 165 and the clearance hole 168 is provided for the sleeve portion 143. It will be noted that the contact plates 140 and 157 are elongated so that the mounting plate 127 may be adjusted relative to the cover 128 to provide the retard-advance adjustment described above in connection with the distributor of Fig. 1. The indexing of the parts is obtained in the same manner as above described in the first modification.

In Fig. 12 there is illustrated the electrical circuit diagram of the distributor unit of Fig. 7. Referring to this figure, the ungrounded side of a conventional battery 170 is connected through the ignition switch 171 and the terminal screw 156 to the spring contact member 151. When the unit 120 is positioned on the housing member 122, the spring contact 151 engages the head portion 152 of the contact stud 153 and when the unit 121 is positioned on the unit 120, the contact plate 157 is connected to the contact pin 162 so that an electrical connection from the battery 170 is established over the above described contacts and the lead 160 to the primary winding 172 of the spark coil positioned within the unit 121. The other end of the primary winding 172 and one end of the secondary winding 173 of the spark coil are connected together to form the lead 136 which is connected to the contact pin 138. When the unit 121 is positioned on top of the unit 120, the contact pin 138 engages the contact plate 140 so that the condenser 41, and the breaker points 67 and 68 are connected between the lead 136 and ground. In this connection, it will be understood that the mounting plate 127 is connected to the distributor body 15 by means of a spring biased contact pin, similar to the contact pin 80 described in detail above in connection with Fig. 6 of the drawings, so that the mounting plate 127 is connected to the other side of the battery 170 through the frame of the vehicle. When the unit 121 is positioned on top of the unit 120, the secondary lead 126 is connected through the contact pin 125 to the receptacle 124 and through the brush 32 to the rotor 29 so that high voltage ignition pulses are distributed to the spark plugs of the engine in timed sequence when the distributor drive shaft 18 is rotated.

In assembling the units 122, 120 and 121, it will be noted that electrical connection between these units is automatically established and maintained without the use of any special tools or equipment and without the necessity of making separate electrical connections. Thus, when the unit 120 is positioned on the housing member 122 and the pin 130 is located in the corresponding opening 129, the head portion 152 engages spring contact member 151 so that battery potential is impressed upon the contact stud 153. Since the connection between the members 151 and 152 is made by spring contact, the mounting plate 127 may be adjusted relative to the cover member 128 to permit the retard-advance adjustment while maintaining the electrical contact to the contact stud 153. The unit 121 is positioned correctly on top of the unit 120 by inserting the high voltage contact pin 125 through the clearance hole 166 in the top wall of the cover 128 so that the pin 125 engages the receptacle 124 in the housing member 122. Since the cover 128 and the housing member 122 always have the same relative position due to the locating pin 130, the pin 125 may be readily positioned within the receptacle 124. As the unit 121 is inserted over the top of the cover 128, contact pins 138 and 162 engage the contact plates 140 and 157 respectively so that the above described electrical connections are established. Since the contact plates 140 and 157, and the clearance hole 127a are elongated the mounting plate 127 may be adjusted relative to the cover 128 to permit adjustment in the timing of the unit 120.

It will be understood that in the embodiment shown in Fig. 7, a separate entrance sleeve 37 (Fig. 5) for the high voltage lead is not required since connection is made directly from the spark coil unit 121 to the brush 32 by means of the above described contact pin arrangement. This eliminates several feet of high voltage conductor which is normally used to connect the spark coil to the distributor. It will further be understood that the timing unit 120 may be adjusted in a manner identical to that described above in connection with Figs. 15, 16 and 17, and distributor of a particular engine may be first adjusted by employing the fixture 91 so that the distributor body of the particular engine will function correctly with any one of a number of similar timing units 120. It will also be noted that the spark coil unit 121 may be removed and replaced by a similar unit independently of the timing unit 120 so that if the spark coil alone is defective, only the unit 121 need be replaced. Furthermore, if the timing unit 120 is defective and the spark coil unit 121 is not defective, the unit 120 alone may be replaced by a similar pretimed unit and the parts assembled in the manner described above.

In Fig. 10 there is shown an alternative arrangement for the connection of battery voltage to the primary winding of the spark coil unit 121. More particularly, in the arrangement shown in Fig. 10 the electrical connection is made directly from the housing 122 to the unit 121 without the use of the intermediate contact stud 153 described above in connection with Figs. 7, 8 and 9. Thus, the terminal screw 156 is connected at the inner end thereof to a terminal member 180 which is embedded in the upper wall of the housing member 122. The member 180 is connected at the inner end thereof to a tubular receptacle 181 which is positioned within a sleeve portion 182 which projects upwardly from the top surface of the housing member 122. A large clearance hole 183 is provided in the mounting plate 127 of the unit 120 so as to permit relative adjustment of the mounting plate 127 and the cover 128 for timing purposes. In the unit 121 the common primary and secondary lead 160 extends through the sleeve portion 165 and terminates in the contact pin 183a which is adapted to engage the receptacle 181 when the unit 121 is positioned on top of the unit 120. In other respects the units 120, 121 and 122 of the embodiment shown in Fig. 10 are identical with the embodiment described in detail in connection with Figs. 7, 8 and 9.

In Figs. 18 to 23, inclusive, there is illustrated an alternative embodiment of the present invention wherein a different type of vacuum advance unit may be employed to control spark timing. More specifically, in the distributor unit shown in Figs. 18 to 23, inclusive, the breaker point mounting plate is rotatably mounted on ball bearings and the vacuum adjustment mechanism is directly connected to the movable mounting plate to permit vacuum control. Thus, referring to these figures, the distributor body is illustrated generally at 200, the secondary circuit housing member is illustrated generally at 201 and the replaceable preadjusted timing unit is illustrated generally at 202. The housing member 201 is provided with a boss portion 203 which extends outwardly from the side thereof and supports the vacuum advance unit indicated generally at 204. The advance unit 204 comprises a mounting bracket 205, a housing 206 which contains a diaphragm 207 (Fig. 22), a diaphragm connecting link 208 and a spring 209 (Fig. 22) which is held against the diaphragm 207 by means of the adjustment nut 210 which contains the vacuum opening 211 which is connected by means of the tube 212 to the carburetor or manifold of the engine. The timing unit 202 is provided with a mounting plate 215 which carries the condenser 41 and the breaker point assembly 43 in substantially the same manner as that described above in connection with the distributor of Fig. 1. Also, the breaker cam member 44 is arranged to be secured to the upper end 45 of the distributor drive shaft when the unit 202 is in place in a manner identical to that described above in connection with the distributor of Fig. 1. The mounting plate 215 of the unit 202 is rotatably mounted within the cover member 216 of the unit 202 by means of the ball bearings 217. More specifically, the cup shaped mounting plate 215 is provided with the annular sloping corner portion 218, the cover member 216 is provided with an annular metal insert 219, and a flat metal washer 220 is held in place by means of a snap ring 221 which fits into a groove 222 formed in the inner bottom wall of the cover member 216. Accordingly, the ball bearings 217 are supported on the washer 220 and support the portion 218 of the mounting plate 215 so as to permit rotation of the mounting plate 215 within the unit 202.

A timing adjustment plate 225 (Fig. 23) is pivotally supported on the bottom of the mounting plate 215 by means of the stud 226 and carries the connecting pin 227 which extends downwardly from the unit 202 and is adapted to engage an opening 228 in the unsupported end of the diaphragm connecting link 208 when the unit 202 is positioned on the housing member 201. The plate 225 may be adjusted by means of the cam screw 229 and may be locked in position by means of the screw 230. The retard-advance scale 231 is inscribed on the bottom of the mounting plate 215 and cooperates with the alignment mark 232 on the plate 225 so as to permit a factory setting of the spark timing and to permit adjustment of this timing in the field.

In order to establish electrical contact to the timing unit 202 while permitting movement of the mounting plate 215 under the control of the vacuum advance unit 204, an opening 235 is provided in the top wall of the housing member 201 within which there is positioned a spring contact member 236 which is connected to the terminal screw 237 positioned in the side wall of the housing 201. The spring contact member 236 is provided with a relatively wide end contact portion 238 which is adapted to engage the head portion 239 of the breaker arm supporting post 240. The post 240 is insulated from the mounting plate 215 so that electrical connection to the condenser and breaker point assembly is established even though the mounting plate 215 is rotated a considerable amount under the control of the vacuum advance unit 204.

In aligning the timing unit 202, the fixture indicated generally at 245 in Fig. 24 is employed. Fixture 245 carries suitable indexing means cooperable with other such means on the plate 215, as hereinafter described in detail. The fixture 245 is provided with the boss 246 in the center of which there is positioned a locking pin 247 which is adapted to extend through the locating hole 248 in the mounting plate 215 when this mounting plate is positioned on the fixture 245. The fixture 245 is also provided with a boss 250 which is adapted to engage the underside of the timing adjustment plate 225 and is further provided with an opening 251 which is adapted to receive the connecting pin 227 when the mounting plate 215 is positioned on the fixture 245. The fixture 245 is also provided with a drive shaft segment 252 which is rigidly secured to the fixture 245 and simulates the upper portion 45 of the distributor drive shaft so that the breaker cam member 44, which is rotatable by shaft 23, may be fixed in predetermined position thereon with respect to the plate 215 and the relatively stationary timing means supported on the plate so that the parts are maintained concentric. The key 253 on the shaft segment 252 is fixed in predetermined relation to the locating hole 251 and when the parts are assembled on the fixture 245 in the manner shown in Fig. 24, so that the angular relation of the cam and plate is fixed. An exact relationship between the stationary and movable parts of the replaceable unit is established on the fixture by the indexing means which is identical with the relationship of the parts when on the engine. The adjustment of the breaker points may be made in a manner substantially identical to that described above in detail in connection with the adjustment fixture shown in Figs. 15, 16 and 17. In this connection, it will be understood that the plate 225 is first adjusted to the mid-point of the scale 231 before the mounting plate 215 is positioned on the fixture 245 so that the breaker points will be correctly adjusted for the mid-point of the factory setting. After the mounting plate assembly has been adjusted in the manner described above the cover member 216 is inverted and the mounting plate 215 is dropped into the cover member 216 and the ball bearings 217 are positioned in the race formed by the portion 218 and the insert 219. The washer 220 is then dropped into place and the snap ring 221 is then positioned in the groove 222 so that the parts are held in assembled relation and the mounting plate 215 is rotatably mounted within the cover member 216.

After the unit 202 has been assembled in the manner described above, it may be positioned on the unit 201 by inserting the connecting pin 227 in the aperture 228 provided in the diaphragm connecting link 208 and then snapping the clips 15a in place so that the timing unit 202 is concentrically positioned on top of the unit 201. In this connection it will be understood that the housing member 201 is provided with the channel 255 through which the diaphragm connecting link 208 extends so that the vacuum advance unit 204 is integral with the secondary housing unit 201 and a substantially dustproof and waterproof construction is provided.

In aligning a particular distributor so that any one of the preadjusted timing units 202 may be employed therewith, the alignment fixture 257 is positioned on the upper end 45 of the distributor drive shaft and is connected thereto by means of the key 46 in a manner similar to the alignment fixture shown and described in detail in connection with Figs. 13 and 14. The projecting arm 258 of the fixture 257 is provided at the outer end thereof with the downwardly extending locating pin 259 which is adapted to project through the opening 228 in the diaphragm connecting link 208 when the parts are positioned correctly. Thus, with the distributor drive shaft adjusted to the conventional timing mark, the distributor body 200 and the housing member 201 are rotated bodily until the pin 259 engages the opening in the end of the diaphragm connecting link 208. In this connection it will be understood that the vacuum advance unit 204 is an integral part of the housing unit 201 so that the rotation of the unit 201 causes the end of the diaphragm connecting link 208 to move in an arc about the axis of the distributor drive shaft.

If it is desired to change the spark timing to accommodate local driving conditions, the unit 202 may be removed and the timing of the unit either advanced or retarded by adjustment of the cam screw 229. In this connection it will be noted that the pin 227 rotates on an arc having as its center the stud 226 when the plate 225 is adjusted, and this arc is of somewhat smaller radius than the distance from the pin 227 to the center of the timing unit. However, it will be understood that sufficient play is provided in the unsupported end of the diaphragm connecting link 208 to permit the pin 227 to engage this link throughout the range provided by the retard-advance scale 231. After the fixture 257 has been positioned in the manner shown in Fig. 25, the distributor body 200 and housing unit 201 are rotated in the proper direction to take up all backlash and play in the distributor after which the body 200 is locked in position by means of the conventional set screw adjustment. The fixture 257 is then removed and any one of the preadjusted timing units 202 may be positioned on the housing 201 and secured in place by means of the clips 15a.

While the distributor of Fig. 18 shows only a replaceable timing unit, it will be understood that a replaceable spark coil unit, similar to the unit 121 described in detail heretofore in connection with Figs. 7, 8 and 9, may be employed with the distributor of Fig. 1. It will also be understood that while the spark coil unit 121 has been illustrated as positioned above the timing unit 120 in the distributor shown in Figs. 7, 8 and 9, the position of these units may be reversed, if desired, so that the timing unit 120 may be readily replaced since failure of this latter unit is most probable.

In Figs. 26 and 27 of the drawings there is shown another embodiment of the invention wherein the cam member is journalled in bearings in the replaceable timing unit so that the distributor drive shaft merely functions to rotate the cam member and whipping or vibration of the end of the distributor drive shaft does not produce undesired variations or fluctuations in the timing of the breaker points. More particularly, referring to these figures, a secondary circuit housing member 270 is supported on the distributor body 271 and provides a support for a replaceable timing unit indicated generally at 272, the unit 272 being enclosed by a separate metallic cover member 273 which seats on the upper flange 274 of the housing member 270 and is sealed by means of the sealing ring 275, the cover 273 being held in place by means of the conventional clips 276 which are secured to the distributor body 271. The secondary circuit housing member 270 is generally similar to the corresponding unit of the embodiment shown in Fig. 1 with the exception that the bottom flange 280 thereof is of increased length and the under surface of the top portion 281 thereof is provided with concentric ridges 282 to provide leakage paths of increased length between the high voltage terminals 283 and the grounded portions of the distributor. The rotor 285, which is keyed to the distributor drive shaft 286 and is made of suitable insulating material, is of general spool shaped construction and an annular band of metal 287 is provided on the reduced diameter portion of the rotor 285 which acts as a slip ring on which the brush 288 rides. The brush 288 is connected to the common high voltage terminal 289, which is adapted to be connected to the spark coil of the ignition system, and a projecting arm 290 is connected to the slip ring 287 so that a sprak gap is formed between the end of the arm 290 and the spark gap electrodes 283 positioned on the side wall of the housing member 270. The upper flange 292 and the lower flange 293 of the rotor 285 provide increased leakage paths for high voltage so that sufficient insulation is provided to meet commerical standards.

The replaceable timing unit 272 is, in many respects, similar to the corresponding unit shown in the embodiment of Fig. 1. However, the cam member 295 which is keyed to the upper end of the distributor drive shaft 286, is journalled in bearings provided in the unit 272 so that the distributor drive shaft 286 performs only the function of rotating the cam member 285 and whipping or side thrust of the upper end of the drive shaft 286 does not cause corresponding variations in the position of the cam member 295. More particularly, a bearing support bracket 296 is secured to the mounting plate 297 of the unit 272 by means of the screws 298 and a sleeve bearing 299 is mounted in the central portion of the bracket 296 and rotatably supports the upper end 300 of the cam member 295. The mounting plate 297 is provided with a central flanged opening adapted to receive a sleeve bearing 301 which rotatably mounts the bottom end 302 of the cam member 295 so that the member 295 is supported at both ends by means of the bearings 299 and 301. A breaker point assembly plate 305 is pivotally mounted on the upwardly flanged portion 306 of the mounting plate 297 and may be clamped to the mounting plate 297 in adjusted position by means of the clamping screws 308 and 309 which extend through slots 310 and 311 in the plate 305 and thread into the mounting plate 297.

The timing condenser 315 is mounted on the plate 297 and the ungrounded lead 316 thereof is connected to a terminal 317 secured to an insulating terminal board 318 which is supported on an upturned lug portion 319 of a breaker point mounting plate 320. The plate 320 rests on the assembly plate 305 and is pivotally mounted on the base of a post 321 which extends upwardly from the plate 305 and insulatingly supports the breaker point actuating arm 322. The plate 320 is provided with an upturned flange 323 to which is secured one of the breaker points 324, the other breaker point 325 being secured to the end of the arm 322. The plate 320 may be moved about the post 321 by means of the eccentric adjustment screw 326 and is clamped to the plate 305 by means of the screw 327. Accordingly, the position of the plate 320 may be adjusted by means of the screw 326 so as to adjust the spacing of the breaker points 324 and 325 to the desired setting.

The entire breaker point assembly may be shifted relative to the cam member 295 by adjusting the position of the plate 305 with respect to the mounting plate 297. To facilitate such adjustment an upstanding lug 330 is provided in the plate 297 and the plate 305 is provided with a U-shaped opening 331 so that the end of a screwdriver may be positioned between the lug 330 and one of the sides of the notch 331, and twisted so as to move the plate 305 relative to the plate 297. The plate 305 is provided with a retard-advance indicia mark 332 which cooperates with the marks 333 on the plate 297 to provide an indication of the timing to which the unit 272 is set. The breaker point actuating arm 322 is electrically connected to the terminal 317 by means of the spring arm 322a thereof and the terminal 317 is connected through the lead 340 to an eyelet 341 which extends through and is insulated from the mounting plate 297. The portion of the eyelet 341 which extends beneath the plate 297 acts as an electrical contact so that the primary circuit is automatically established to the breaker points and condenser when the unit 272 is positioned on the housing member 270. In this connection it will be understood that the housing member 270 is provided with a suitable resilient contact member (not shown), similar to the spring contact member 80 of the embodiment shown in Fig. 1, which is secured to the side wall of the housing memebr 270 so that a primary circuit connection is automatically established by positioning the unit 272 on the housing member 270. The ground connection for the unit 272 may be established by any suitable means. In the embodiment shown in Fig. 26 the metal cover plate 273 is provided with a dimpled portion 273a in the center thereof which engages the end 300 of the cam member 295 so that the unit 272 is grounded through the cover member 273 and the mounting clips 276 to the distributor body and hence to the frame of the vehicle. In the alternative, a contact pin arrangement, similar to the contact pin 80 employed in the embodiment shown in Fig. 1, may be associated with the housing member 270 so as to provide a ground connection between the mounting plate 297 and the shell of the distributor body 271, as will be readily understood by those skilled in the art. It will also be understood that a sufficiently low resistance ground connection may be provided through the bearings 299 and 301 and the cam member 295 to the drive shaft 286 in which case the additional grounding arrangement described above is not required. The mounting plate 297 is provided with a notch 337 in the periphery thereof which cooperates with a locating or indexing pin 338 positioned in the top wall of the housing member 270, the mounting plate 297 being held in place within the opening formed by the flanged portion 274 of the housing member 270 by means of a snap ring 339. In order to facilitate removal of the timing unit 272 from the distributor, the bracket 296 is provided with the upturned flange portions 335 and 336 which may be gripped by the thumb and forefinger so that the unit 272 may be readily removed.

In order to pretime the unit 272 to a standard factory setting a sub-assembly unit or fixture indicated generally at 345 in Fig. 28 may be employed. The unit 345 consists of a base member 346, which is preferably of metal and is provided with a recess 347 within which there is positioned a spring contact 348 at the correct position to engage the bottom portion of the eyelet 341 of the unit 272, the spring contact 348 being insulated from the base member 346 by means of the insulating sleeve 349. On the fixture 346 is a locating pin 350 to index the angular relation between the plate 297 and fixture 346 and simulated distributor drive shaft segment 351 to index the angular relation between cam 295 and fixture 346 so that the cam member 295 is positioned in the desired angular relationship with respect to the mounting plate 297. In this modification, indexing for concentric relation between the cam 295 and the plate 297 is unnecessary because the latter is journaled on the former. With the cam member 295 fixed in position by the member 351, the breaker points are then adjusted to the proper gap setting by means of the adjustment screw 326 and the plate 320 is then clamped to the assembly plate 305 by means of the screw 327. Prior to this adjustment the plate 305 is adjusted to the center point of the advance-retard scale 333 so that adjustment in either direction from the standard factory setting may be made to adjust the timing to local conditions, as described in more detail above in connection with the embodiment of Fig. 1. Preferably, a low voltage lamp circuit (not shown) is connected between the base member 346 and the spring contact 348 so that the breaker points may be adjusted to the correct gap setting by merely noting when the lamp either goes on or goes off, as described in more detail above in connection with the embodiment of Fig. 1.

After the unit 272 has been adjusted to a standard factory setting it may then be used in any distributor which has been aligned by means of a suitable alignment jig or fixture, such as the alignment fixture shown in Figs. 13 and 14 in connection with the embodiment of Fig. 1. In this connection it will be understood that the alignment fixture employed with the embodiment shown in Fig. 26 is provided with suitable locating means adapted to register with the indexing pin 338 and the end of the distributor drive shaft so that the distributor body 271 may be clamped in correct position for operation with any one of a number of pretimed units 272.

In Fig. 29, there is shown another embodiment of the invention wherein the pretimed unit 272, described in detail above in connection with Figs. 26 and 27 is employed in a conventional distributor arrangement wherein the secondary ignition parts are located in the upper portion of the distributor cap and above the pretimed unit 272. Referring to this figure, the distributor body 360 is provided with an annular seat 361 which is adapted to receive the mounting plate 297 of the timing unit 272. An indexing pin 362 extends inwardly through the side wall of the distributor body 360 and is adapted to be positioned within the notch 337 in the mounting plate 297 when the unit 272 is correctly positioned on the distributor body 360. Any suitable means, such as the snap ring 363, may be employed to hold the timing unit 272 in place within the distributor body 360. The distributor cap 365 is provided with the conventional spark gap electrodes 366 which are mounted in suitable insulating sleeves in the top wall of the cap 365, and the common high voltage terminal 367 is centrally mounted in the cap 365 and the depressible pin 368, mounted in the terminal 367, is adapted to engage a contact arm 369 of the distributor rotor hub 370. The rotor hub 370 is mounted on and keyed to an extension portion 371 of the cam member 295 so that the distributor drive shaft 375 is keyed to the cam member 295 which is also keyed to the rotor hub 370 so that these members rotate together.

In order to establish the primary circuit connection to the condenser and breaker points of the timing unit 272, a spring contact arm 380 is mounted in the wall of the distributor body by means of the terminal screw 381 and is insulated from the distributor body by means of the insulated spacer 382. Accordingly, a primary circuit connection can be made to the terminal screw 381 and the eyelet 341 makes electrical contact with the spring contact arm 380 when the unit 272 is correctly positioned within the distributor body 360. It will be noted that in the embodiment shown in Fig. 29, the flanges 335 and 336 of the unit 272 provide a convenient means for removing the unit 272 from the distribtuor body 360 after the snap ring 363 has been removed. It will also be noted that in the embodiment shown in Fig. 29, the cam member 295 is mounted relatively close to the bearing of the distributor drive shaft 375 so that a rugged structure is provided in which the cam member 295 is accurately driven from the drive shaft 375. In this connection it will be understood that in the embodiment of Fig. 29 a suitable alignment fixture, such as the fixture shown in Fig. 13 in connection with the embodiment of Fig. 1, may be employed to adjust the distributor body 360 initially so that it will function with any one of a number of identical pretimed units, this alignment fixture being adapted to be keyed to the extension portion 371 of the cam member 295 and to cooperate with the locating pin 362. If desired, a dustproof arrangement may be provided in the embodiment shown in Fig. 29 by providing a suitable partition, which may be removable, between the rotor hub 370 and the unit 272 so that the upper portion of the distributor cap 365, which is vented to the atmosphere through the openings 385, is isolated from the area in which the breaker points of the unit 272 are located. With this arrangement the ozone generated due to arcing between the spark gap electrodes will not contaminate or foul the breaker points of the unit 272. The embodiment of Fig. 29 may be modified in the manner shown in Fig. 30 to support the cam member directly on the distributor drive shaft. Thus, the bearings 299 and 301 are eliminated and a cam member 390 is employed which is supported on the upper end 391 of the distributor drive shaft 392, the cam member 390 being keyed to the drive shaft 392 by means of the key 393. The upper portion 391 is provided with a keyway 394 which is adapted to engage a suitable inwardly extending key in the rotor hub 370 so that the units 390 and 370 are supported entirely from the distributor drive shaft 392. In other respects the embodiment shown in Fig. 30 is identical to that shown and described in detail in connection with Fig. 29, it being understood that the cam member 390 is loosely held in the unit 272 by means of the bracket 296 and the flange 306 when the unit 272 is removed from the distributor.

While the embodiments of the present invention have been described in connection with the conventional battery ignition system, it will be understood that a replaceable, preadjusted timing unit constructed in accordance with the principles of the present invention may equally well be employed in a magneto type ignition system wherein a magneto is employed to generate the necessary energy to deliver high voltage to the spark plugs of the engine. In this connection it will be understood that the magneto type system employs cam operated breaker points and an associated condenser in substantially the same manner as the battery ignition system described in detail above, although certain minor modifications would be required to adapt the timing unit to the physical arrangement of a magneto type distributor, as will be readily understood by those skilled in the art.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In an engine ignition system, a distributor including a housing, a shaft driven in timed relation with the engine, a replaceable pretimed unit including a plate for assembly with said housing, breaker point means and a breaker actuating cam member, said unit being provided with locating means and, when pretimed, having a predetermined relation between said cam member and said breaker point means and between said breaker point means and said locating means, means including locating means in said housing cooperating with said locating means on said unit for positioning said unit in said housing with said cam member connected to said shaft and in said predetermined relation with respect to said breaker point means, and quickly detachable securing means for securing said unit in said housing, whereby said pretimed unit may be readily removed upon failure thereof and replaced by a similar pretimed unit without necessitating adjustment of the timing thereof.

2. In an engine ignition system, a distributor including a housing, a shaft driven in timed relation with the engine, a replaceable pretimed unit including a plate for assembly with said housing, breaker point means and a breaker point actuating cam member, means for positioning said unit in said housing with said engine driven shaft drivingly connected to said cam member, said last named means controlling the relative position of said plate and said housing such that when said housing is in a predetermined position with respect to said shaft said shaft positions said cam member with respect to said plate to cause correctly timed actuation of said breaker point means, and quickly detachable securing means for securing said plate in said housing, whereby said pretimed unit may be readily removed upon failure thereof and replaced by a similar pretimed unit without necessitating adjustment of the timing thereof.

3. In an engine ignition system, a distributor including a housing, a shaft driven in timed relation with the engine, first locating means on said shaft having a predetermined relation to said housing at a particular alignment position of the engine, a replaceable pretimed unit including a supporting plate, a breaker point assembly adjustable relative to said supporting plate and a breaker point actuating cam member positioned on said supporting plate, cooperating locating means on said unit and within said housing for positioning said unit in predetermined assembled relation within said housing, and second locating means on said cam member cooperating with said first locating means on said shaft to position said cam member on said shaft in proper relation to said breaker point assembly to cause timed actuation of the breaker points in synchronism with the operation of the engine when said unit is assembled in said predetermined relation within said housing.

4. In an engine ignition system, a distributor body, a replaceable pre-assembled, pre-timed timing unit comprising a mounting plate and a circuit making and breaking means positioned on said plate, a vacuum advance unit supported on said distributor body and including a transversely extending diaphragm connecting link, and means automatically interconnecting said mounting plate and the end of said connecting link when said timing unit is positioned in said distributor body, whereby said mounting plate is rotated by said vacuum advance unit while permitting replacement of said timing unit upon failure thereof.

5. In an engine ignition system, a distributor body, a replaceable pre-assebled, pre-timed timing unit comprising a mounting plate circuit making and breaking means positioned on said plate, and a breaker actuating cam member, said cam member being positioned in predetermined relation to said circuit making and breaking means and said circuit making and breaking means being positioned in predetermined relation to said mounting plate, a vacuum advance unit supported on said distributor body and including a transversely extending diaphragm connecting link means automatically interconnecting said mounting plate and the end of said connecting link when said timing unit is positioned in said distributor body with said cam member in said predetermined relation to said circuit making and breaking means, whereby said mounting plate is rotated by said vacuum advance unit while permitting replacement of said unit upon failure thereof, and quickly detachable securing means for securing said timing unit in said distributor body.

6. In an engine ignition system, a distributor body, a replaceable timing unit including a mounting plate and a breaker point assembly carried on said mounting plate, means for positioning said unit on said distributor body in predetermined relation thereto, an electrical contact connected to said breaker point assembly and insulated from the said mounting plate, contact means on said distributor adapted to engage said electrical contact when said unit is positioned on said distributor body and to establish an electrical circuit to said breaker point assembly, said electrical circuit being connected to said mounting plate when the points of said breaker point assembly are closed, means for electrically grounding said mounting plate to said distributor body when said unit is positioned thereon, and quickly detachable securing means for securing said unit to said distributor body, whereby said unit may be readily removed and replaced by a similar unit.

7. A replaceable, pretimed unit for use in an engine ignition system having a shaft driven from the engine and a housing, said replaceable unit comprising a removable plate for said housing, an electric timing mechanism positioned on said plate to be driven from said shaft and constructed and arranged to be set to perform in predetermined timed relation with engine operation when said plate is assembled with said housing, and locating means on said plate and on said timing mechanism for initially presetting said timing mechanism and for subsequently cooperating with corresponding locating means on said housing and said engine driven shaft, respectively, to synchronize operation thereof with the engine.

8. A replaceable timing unit for an engine ignition system, comprising a mounting plate, a breaker point assembly mounted on said mounting plate and including a breaker point actuating arm, a cam member rotatably supported on said mounting plate and having projections adapted to engage said breaker point actuating arm, and locating means for said mounting plate, said cam member having a predetermined relation to said locating means when one of said projections engages said breaker point actuating arm.

9. A replaceable timing unit for an engine ignition system, comprising a mounting plate, a breaker point assembly plate mounted on said mounting plate and adjustable with respect thereto, a breaker point assembly on said assembly plate and including a breaker point actuating arm, a cam member rotatably mounted on said mounting plate and having projections adapted to engage said breaker point actuating arm, said cam member having a predetermined relation to said mounting plate when said projections engage said breaker point actuating arm, and means for indicating the relative position of said mounting plate and said breaker point assembly plate, whereby said predetermined relation may be changed as desired to advance or retard the timing of said unit.

10. A replaceable timing unit for an engine ignition system, comprising a mounting plate, a breaker point assembly plate having a breaker point assembly adjustably mounted thereon, said breaker point assembly including a breaker point actuating arm, a cam member rotatably mounted on said mounting plate and having projections adapted to engage said breaker point actuating arm, said breaker point assembly plate being pivotally mounted on said mounting plate for arcuate movement about the axis of said cam member, said cam member having a predetermined relation to said mounting plate when said projections engage said breaker point actuating arm, cooperating means on said breaker point assembly plate and said mounting plate for facilitating arcuate movement of said breaker point assembly plate, and means for indicating the relative position of said mounting plate and said breaker point assembly plate, whereby said predetermined relation may be changed as desired to advance or retard the timing of said unit.

11. A replaceable timing assembly for an engine ignition system, comprising a mounting plate adjustable affixed to a cover member, a breaker point assembly positioned on said mounting plate, said cover member adapted to enclose said breaker point assembly and adjustable relative to said mounting plate, means including locating means on said cover member for positioning said cover member in predetermined relation to said mounting plate, adjustable means for securing said cover member and said mounting plate together in said predetermined relation, and means for indicating the relative position of said cover member and said mounting plate, whereby said predetermined relation may be changed as desired to advance or retard the timing of said unit.

12. An engine distributor, comprising a distributor body having a distributor drive shaft extending therethrough, a replaceable preadjusted timing unit including an adjustable breaker point means and a breaker actuating cam member, indexing means on said unit for providing a standard preset adjustment of said cam member with respect to said breaker point means, means including cooperating locating means on said unit and said distributor body for positioning said unit on said distributor body in predetermined relation thereto with said drive shaft connected to said cam member, and means for initially adjusting the position of said distributor body with respect to said drive shaft before assembly of said replaceable unit to cause correctly timed actuation of said breaker point means by said cam member after assembly with said cooperating locating means, whereby said unit may be removed and replaced by a similar preadjusted unit without requiring further adjustment of said distributor body.

13. An engine distributor, comprising a distributor body having a distributor drive shaft extending therethrough, a secondary ignition circuit housing member of insulating material positioned on said distributor body and including a plurality of secondary circuit electrodes extending therefrom, a distributor rotor positioned within said housing member and connected to said drive shaft, means for establishing a secondary electrical circuit connection to said distributor rotor, a replaceable preadjusted timing unit positioned on said secondary housing member and including a breaker point assembly and a breaker actuating cam member connected to said drive shaft, cooperating locating means on said unit and said housing member for positioning said unit in predetermined relation to said housing member, and means including cooperating contact means on said unit and said housing member for establishing a primary electrical circuit through said breaker point assembly to said distributor body when said unit is positioned on said housing member in said predetermined relation thereto, whereby said unit may be removed upon failure thereof and replaced by a similar preadjusted unit.

14. An engine distributor, comprising a distributor body having a distributor drive shaft extending therethrough, a secondary ignition circuit housing member of insulating material positioned on said distributor body and including secondary circuit distributor means including a rotor connected to said drive shaft, a replaceable preadjusted timing unit including breaker point means and a breaker actuating cam member, indexing means on said unit for determining a standard preset adjustment of said unit, means including cooperating locating means on said unit and said housing member for positioning said unit on said housing member in predetermined relation thereto with said drive shaft drivingly connected to said cam member, and means for initially adjusting the position of said distributor body with respect to said drive shaft before assembly of said replaceable unit to cause correctly timed actuation of said breaker point means by said cam member when said unit is preset to a standard adjustment, whereby said unit may be removed upon failure thereof and replaced by a similar unit preadjusted to a standard setting without requiring further adjustment of said distributor body.

15. An engine distributor, comprising a distributor body having a distributor drive shaft extending therethrough, a secondary ignition circuit housing member of insulating material positioned on said distributor body and including secondary circuit distributing means including a rotor connected to said drive shaft, a replaceable preadjusted timing unit including a breaker point assembly and a breaker actuating cam member, said breaker point assembly being adjusted for correctly timed operation when said cam member has a predetermined position relative to said unit, means including cooperating locating means on said unit and said housing member for positioning said unit on said housing member with said cam member connected to said drive shaft and in said predetermined position relative to said unit, and quickly detachable securing means for securing said unit on said housing member in said locating position, whereby said unit may be readily removed and replaced by a similar preadjusted unit.

16. Apparatus for assembling and adjusting a replaceable timing unit for an engine distributor, comprising a mounting plate, a breaker point assembly positioned on said mounting plate, a breaker actuating cam member, means for positioning said cam member in predetermined relation to said mounting plate to permit adjustment of said breaker point assembly to a standard factory setting, a cover member adapted to enclose said breaker point assembly and adjustable relative to said mounting plate, means including locating means on said cover member for positioning said cover member in predetermined relation to said mounting plate, and means for securing cover member and said mounting plate together in said predetermined relation.

17. Apparatus for assembling and adjusting a replaceable timing unit for an engine distributor, comprising a mounting plate, a breaker point assembly positioned on said mounting plate, a breaker actuating cam member, means for positioning said cam member in predetermined relation to said mounting plate to permit adjustment of said breaker point assembly to a standard factory setting, a cover member adapted to enclose said breaker point assembly and adjustable relative to said mounting plate, means including locating means on said cover member for positioning said cover member in predetermined relation to said mounting plate, and means for securing cover member and said mounting plate together in said predetermined relation, said last-named means being adjustable to permit said predetermined relation to be changed, thereby to vary the timing of said unit from said factory setting.

18. Apparatus for adjusting a replaceable timing unit for an engine distributor, comprising a mounting plate, a breaker point assembly positioned on said mounting plate, a breaker actuating cam member, locating means carried by said mounting plate fixture means for positioning said cam member in predetermined relation to said locating means, and means for positioning said breaker point assembly in predetermined relation to said cam member while said cam member is positioned in said predetermined relation to said locating means, thereby to permit adjustment of said breaker point assembly to a standard factory setting.

19. In an engine ignition system, a distributor body, a secondary ignition circuit housing member of insulating material positioned on said distributor body and including secondary circuit distributing means having a rotor connected to the distributor drive shaft, a replaceable preadjusted timing unit positioned on said housing and including circuit making and breaking means, a replaceable spark coil unit positioned on said timing unit, cooperating contact means on said housing, said timing unit and said spark coil unit for establishing electrical connection to said circuit making and breaking means through said spark coil unit when said units are assembled in stacked relation on said housing, and quickly detachable securing means for holding said units in said stacked relation on said distributor body, whereby either of said units may be readily removed upon failure thereof and replaced by a similar unit.

20. In an engine ignition system, a distributor body having a distributor drive shaft extending therethrough, a distributor rotor connected to said drive shaft within said body, a replaceable preadjusted timing unit including circuit making and breaking means, a replaceable spark coil unit including primary and secondary spark coil windings, means for securing said units in stacked relation on said distributor body, means including first cooperating contact means on said distributor body and said spark coil unit for establishing a high voltage connection between said secondary winding and said distributing rotor, means including second cooperating contact means on said distributor body and said spark coil unit for establishing a low voltage connection to said primary winding, and means including third cooperating contact means on said timing unit and said spark coil unit for establishing an electrical connection from said spark coil windings through said circuit making and breaking means to said distributor body.

21. In an engine ignition system, a distributor body, a replaceable timing unit comprising a housing and a mounting plate rotatably mounted in said housing, circuit making and breaking means positioned on said mounting plate within said housing, a vacuum advance unit supported on said distributor body and including a transversely extending diaphragm connecting link, and cooperating means on said mounting plate and said connecting link for automatically connecting said mounting plate to said vacuum advance unit when said timing unit is positioned on said distributor body, whereby said mounting plate is rotated by said vacuum advance unit while permitting replacement of said timing unit upon failure thereof.

22. In an engine ignition system, a distributor body, a replaceable timing unit comprising a housing and a mounting plate rotatably mounted in said housing, circuit making and breaking means positioned on said mounting plate within said housing, a vacuum advance unit supported on said distributor body and including a transversely extending diaphragm connecting link, a connecting pin movable with respect to said mounting plate and extending downwardly from said timing unit, said connecting pin being adapted to engage an opening in said connecting link when said timing unit is positioned on said distributor body, cooperating contact means on said timing unit and said distributor body for establishing electrical connection to said circuit making and breaking means when said timing unit is positioned on said distributor body, and quickly detachable securing means for holding said timing unit on said distributor body.

23. In an engine ignition system, a distributor body, a replaceable timing unit comprising a housing and a mounting plate rotatably mounted in said housing circuit making and breaking means positioned on said mounting plate within said housing, a vacuum advance unit supported on said distributor body and including a transversely extending diaphragm connecting link, a connecting pin movable with respect to said mounting plate and extending downwardly from said timing unit, said connecting pin being adapted to engage an opening in said connecting link when said timing unit is positioned on said distributor body, means for adjusting the position of said connecting pin with respect to said mounting plate, means for indicating the relative position of said mounting plate and said connecting pin, thereby to indicate the timing adjustment of said unit, cooperating contact means on said timing unit and said distributor body for establishing electrical connection to said circuit making breaking means when said timing unit is positioned on said distributor body, and quickly detachable securing means for holding said timing unit on said distributor body.

24. A replaceable, pretimed unit for use in an engine ignition system having a shaft driven from the engine and a relatively fixed support, said replaceable timing unit comprising a plate for assembly with said support, an electric timing mechanism positioned on said plate to be driven from said shaft and connected and arranged for adjustment to a set position radially and circumferentially about said shaft to perform in predetermined timed relation with engine operation when said plate is assembled on said support, and locating means on said plate and on said timing mechanism for initially presetting said timing mechanism before assembly and for subsequently cooperating with corresponding locating means on said housing and said engine driven shaft, respectively, to synchronize operation thereof with the engine.

25. A replaceable, pretimed unit for use in an engine ignition system having a shaft driven from the engine, and a relatively fixed housing, said replaceable unit comprising a plate removable from said housing, in electric timing mechanism including breaker point means and a cam for actuating said breaker point means, both mounted on said plate to be operated in timed relation with said shaft, means to set said timing mechanism before assembly with said housing including an adjustment for said breaker point means and locating means on said plate and on said timing mechanism so that said plate, said cam and said breaker point means may be positioned in predetermined relation to one another, and locating means in said housing and on said engine drive shaft and cooperating with said locating means on said plate and on said timing mechanism, respectively, upon assembly of said unit with said housing, to synchronize operation of said timing mechanism with the engine.

26. In an engine ignition system, a distributor including a housing, a shaft driven in timed relation with the engine, a timing cam having a fixed relationship on said shaft, a plate removably mounted in said housing, ignition timing mechanism on said plate for cooperating with said cam, adjusting means for setting said timing mechanism, and coordinated locating means on said shaft and said housing and cooperable with said adjusting means for presetting said timing mechanism relative to said housing and said shaft to insure correct synchronizing of said timing mechanism upon assembly.

27. In an ignition system for an engine, the combination of a housing, a shaft driven in timed relation to the engine, and a replaceable, pretimed unit comprising a plate for assembly with said housing, an electric timing mechanism on said plate adapted to be driven from said shaft when said plate is assembled with said housing, means to set said timing mechanism to perform in a predetermined timed relation with engine operation including locating means on said plate and cooperating locating means on said housing for positioning said plate within said housing in correct relation to said shaft for operation of said system in predetermined timed relation with said engine.

References Cited in the file of this patent

UNITED STATES PATENTS

| | | |
|---|---|---|
| 2,161,043 | Heintz | June 6, 1939 |
| 2,205,074 | Van Damme | June 18, 1940 |
| 2,303,464 | Hove | Dec. 1, 1942 |
| 2,594,447 | Kerr | Apr. 29, 1952 |
| 2,605,368 | Scott | July 29, 1952 |
| 2,611,837 | Zirin | Sept. 23, 1952 |
| 2,617,899 | Brunk | Nov. 11, 1952 |
| 2,619,513 | Wolfenbarger | Nov. 25, 1952 |
| 2,640,891 | Buck et al. | June 2, 1953 |